US008984188B2

(12) United States Patent
Jol et al.

(10) Patent No.: US 8,984,188 B2
(45) Date of Patent: Mar. 17, 2015

(54) EXTERNAL CONTACT CONNECTOR

(71) Applicant: Apple Inc., Cupertino, CA (US)

(72) Inventors: Eric S. Jol, San Jose, CA (US); Albert J. Golko, Saratoga, CA (US); Mathias W. Schmidt, Mountain View, CA (US); Jahan C. Minoo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/945,247

(22) Filed: Jul. 18, 2013

(65) Prior Publication Data

US 2014/0004741 A1 Jan. 2, 2014

Related U.S. Application Data

(63) Continuation of application No. PCT/US2012/022795, filed on Jan. 26, 2012.

(60) Provisional application No. 61/436,545, filed on Jan. 26, 2011.

(51) Int. Cl.

| | |
|---|---|
| ***G06F 13/38*** | (2006.01) |
| ***H01R 13/66*** | (2006.01) |
| ***H01R 29/00*** | (2006.01) |
| *H01R 107/00* | (2006.01) |

(52) U.S. Cl.

CPC .............. *H01R 13/665* (2013.01); *H01R 29/00* (2013.01); *H01R 2107/00* (2013.01); *H01R 2201/06* (2013.01)

USPC ................. 710/71; 710/62; 710/63; 710/305; 710/313; 709/220; 709/221; 709/222

(58) Field of Classification Search

None

See application file for complete search history.

(56) References Cited

U.S. PATENT DOCUMENTS

| | | | | |
|---|---|---|---|---|
| 6,908,340 | B1 | 6/2005 | Shafer | |
| 7,850,082 | B1 * | 12/2010 | Chow et al. | 235/451 |
| 8,683,090 | B2 * | 3/2014 | Mullins et al. | 710/16 |
| 2006/0024997 | A1 | 2/2006 | Teicher | |
| 2008/0129871 | A1 * | 6/2008 | Wang et al. | 348/515 |

(Continued)

FOREIGN PATENT DOCUMENTS

| | | | |
|---|---|---|---|
| EP | 2034423 | A2 | 3/2009 |
| EP | 2169774 | A1 | 3/2010 |
| WO | 2009069969 | A2 | 6/2009 |

OTHER PUBLICATIONS

IEEE, "1394b IEEE Standard for a High-Performance Serial Bus—Amendment 2," 2002, 381 pages.

(Continued)

*Primary Examiner* — Michael Sun

(74) *Attorney, Agent, or Firm* — Kilpatrick Townsend & Stockton LLP

(57) ABSTRACT

A plug connector with external contacts is provided. The connector has one pair of contacts for transmitting data and one pair of contacts for receiving data. All data transmitted and received using the plug connector is serialized/de-serialized to enable data transmission at a very high rate. A corresponding receptacle connector has configurable contacts that are configured based on the orientation of the plug connector with respect to the receptacle connector. The receptacle connector may be included in a host device and has associated circuitry to detect orientation of the plug connector and to configure the contacts of the receptacle connector.

23 Claims, 8 Drawing Sheets

(56) References Cited

U.S. PATENT DOCUMENTS

| | | | | |
|---|---|---|---|---|
| 2008/0167828 | A1 | 7/2008 | Terlizzi et al. | |
| 2008/0299824 | A1 * | 12/2008 | Legg | 439/595 |
| 2009/0073320 | A1 * | 3/2009 | Todo et al. | 348/705 |
| 2010/0046751 | A1 * | 2/2010 | Kobayashi | 380/201 |
| 2010/0080563 | A1 | 4/2010 | DiFonzo et al. | |
| 2010/0321573 | A1 * | 12/2010 | Bohm | 348/554 |
| 2011/0087806 | A1 * | 4/2011 | Mohanty et al. | 710/16 |
| 2012/0064772 | A1 * | 3/2012 | Pocrass | 439/625 |
| 2012/0131309 | A1 * | 5/2012 | Johnson et al. | 712/41 |

OTHER PUBLICATIONS

Partial Search Report for International PCT Application No. PCT/US2012/022795, mailed May 16, 2012, 7 pages.

International Search Report and Written Opinion for International PCT Application No. PCT/US2012/022795, mailed Aug. 31, 2012, 21 pages.

International Preliminary Report on Patentability for International PCT Application No. PCT/US2012/022795, mailed Aug. 8, 2013, 12 pages.

* cited by examiner

| Contact | Charge/Sync cable | Powered Accessory | Wired Headset | Headphone adapter | Unpowered accessory |
|---|---|---|---|---|---|
| 104a | voltage IN | voltage IN | microhone OUT | microphone OUT | voltage OUT |
| 104b | - | ID | GND | GND | ID |
| 104c | Data 1 | data 1 | left | left | data 1 |
| 104d | Data 2 | data 2 | right | right | data 2 |

*Fig. 3*

EXTERNAL CONTACT CONNECTOR

CROSS-REFERENCES TO RELATED APPLICATIONS

This application is a continuation of International Application No. PCT/US2012/022795 filed Jan. 26, 2012, which claims benefit of U.S. Provisional Patent Application No. 61/436,545 filed on Jan. 26, 2011. The contents of both these applications are incorporated by reference herein in their entirety for all purposes.

FIELD OF INVENTION

The present invention relates generally to input/output electrical connectors such as audio connectors and data connectors and in particular to slim or low profile connectors that can be used in place of standard connectors currently used.

BACKGROUND

There are many different types of connectors available in the market for connecting a host device and an accessory. Most connectors are manufactured to perform a specific function. Moreover, each contact in a conventional connector is designated to carry a particular signal, e.g., power, audio data, video data, etc. The manufacturer of the host device and/or the accessory generally defines the function of each contact within a connector. Once a conventional connector is designed and manufactured based on the specifications, the contacts cannot be configured on the fly during operation. For example, in a USB connector, certain contacts are designated for carrying data. These contacts cannot be reconfigured dynamically to carry any other signals. In other words, the data contacts in a USB connector can only carry data signals and not any other signals.

SUMMARY

Embodiments of the present invention provides a receptacle connector in which individual contacts are dynamically configurable based on the desired function for each contact. Additionally, plug connectors according to the present invention have external contacts instead of internal contacts and thus do not include a cavity that is prone to collecting and trapping debris. Other embodiments of the invention pertain to receptacle connectors adapted to mate with plug connectors of the invention.

To better understand the nature and advantages of the present invention, reference should be made to the following description and the accompanying figures. It is to be understood, however, that each of the figures is provided for the purpose of illustration only and is not intended as a definition of the limits of the scope of the present invention.

BRIEF DESCRIPTION OF THE DRAWINGS

FIG. 3 is a table illustrating the various signals that can be used with the plug connector and the receptacle connector according to an embodiment of the present invention;

DETAILED DESCRIPTION

Figure 1A:
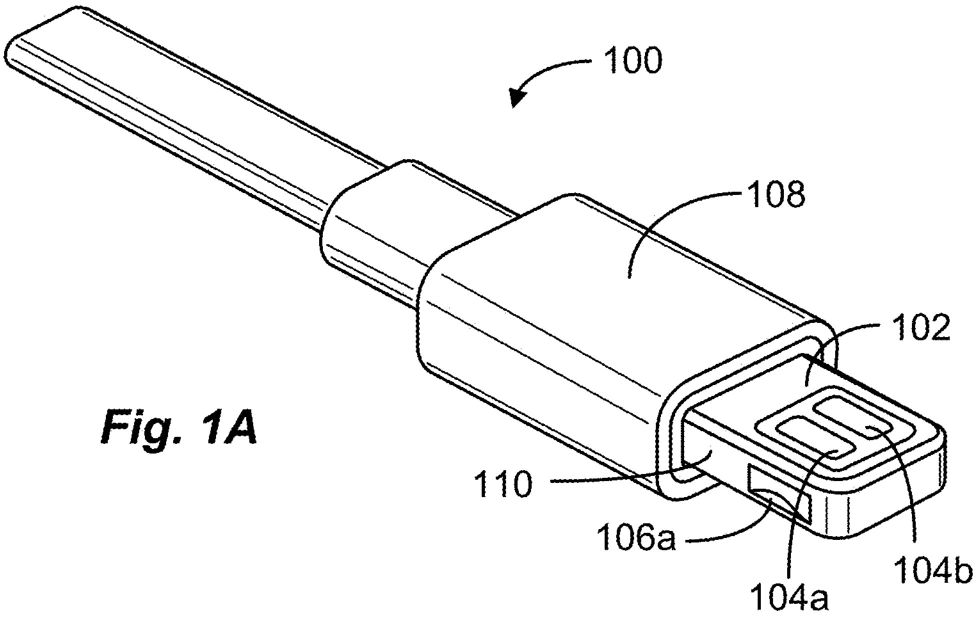
FIG. 1A is a simplified perspective view of a connector plug according to an embodiment of the invention.

In order to better appreciate and understand the present invention, reference is made to FIG. 1A which depicts a plug connector 100 according to the present invention. Specifically, FIG. 1A is a simplified perspective view of plug connector 100. As shown, connector 100 includes a tab 102 that extends from an outer shell 108 that can be made from a dielectric material such as a thermoplastic polymer and formed in an injection molding process. Tab 102 has a front major surface upon which two contacts 104*a* and 104*b* are positioned and a back major surface (not shown) upon which two additional contacts 104*c* and 104*d* (not shown) are located. The contacts can be made from a copper, nickel, brass, a metal alloy or any other appropriate conductive material. Spacing is consistent between each of the contacts on the front and back sides and between the contacts and the edges of the connector providing 180 degree symmetry so that plug connector 100 can be inserted into a corresponding receptacle connector in either of two orientations as discussed below.

A significant portion of tab 102 is part of a ground ring 110 that extends from a distal tip of the connector towards the outer shell and partially surrounds contacts 104*a*-104*d* along an outer periphery of tab 102. Ground ring 110 can be made from any appropriate metal or other conductive material and in one embodiment is stainless steel plated with copper and nickel. Two indentations or pockets 106*a* and 106*b* (not shown) are formed in ground ring 110 and located on opposing sides of tab 102 near its distal end. In operation, tab 102 is inserted into a receptacle connector (shown in FIGS. 4 and 5) until pockets 106*a* and 106*b* operatively engage with a retention mechanism, such as a cantilevered spring or detent. The retention mechanism fits within pockets 106 and provides a retention force that secures connector 100 to the matching receptacle connector. In order for the connectors to be separated, a force greater than the retention force must be supplied in a direction that pulls the mated connectors away from each other. In other embodiments, other retention mechanisms can be used such as mechanical or magnetic latches or orthogonal insertion mechanisms.

As shown in FIG. 1A, contacts 104*a*-104*d* are external contacts that are positioned along an outer surface of tab 102 and connector 100 does not include an exposed cavity in which particles and debris may collect. To improve robustness and reliability, connector 100 is fully sealed and includes no moving parts. Furthermore, connector 100 has a considerably reduced insertion depth and insertion width as compared to commonly available connectors. For example, in one embodiment, the width of the plug connector is about 40 mm or less, thickness is about 1.5 mm or less, and insertion depth is about 6 mm or less. It is understood that the dimensions of connector 100 as well as the number of contacts may vary in different embodiments.

When connector 100 is properly engaged with a receptacle connector each of contacts 104*a* and 104*b* is in electrical contact with a corresponding contact in the receptacle connector. Tab 100 has a 180 degree symmetrical, double orientation design which enables the connector to be inserted into a connector jack in both a first orientation or a second orientation. Thus, connector 50 can be said to be orientation agnostic. In the first orientation, plug connector contacts 104*a* and 104*b* couple to receptacle contacts. In the second orientation opposite the first orientation, plug contacts 104*c* and 104*d* couple to receptacle contacts.

In order to ensure that the receptacle connector's contacts properly align with the plug connector contacts in each orientation, a sensing circuit in the receptacle connector or the host device in which the receptacle connector is housed, can detect the orientation of the connector and set software and/or hardware switches to switch internal connections to the contacts in the receptacle connector and properly match the receptacle connector's contacts to the plug connector's contacts as appropriate. In some embodiments the orientation of the plug connector can be detected based on a physical key in the connector. In other embodiments, such as the embodiments represented by connector 100, the plug connector does not include a physical key and the orientation is instead detected by circuitry associated with the corresponding receptacle connector based on signals received over the contacts.

As an example, various accessories such as headsets for cellular phones include a microphone and allow a user to perform basic functions such as setting earphone volume and answering and ending calls with the push of a button on the accessory. A single wire, serial control chip can be used to communicate with the host electronic device and implement this functionality over a particular contact or set of contacts. When the plug connector is inserted into the receptacle jack, the serial control chip can talk to appropriate circuitry in host electronic device via the designated contact or contacts. Upon an insertion event, the host device sends an Acknowledgment signal to the serial control chip over the designated contact in the receptacle connector and waits for a Response signal. If a Response signal is received, the receptacle connector contacts are aligned properly and audio and other signals can be transferred between the connectors. If no Response signal is received, the host device flips the contacts on the receptacle connector to correspond to the second possible orientation (i.e., flips the contacts 180 degrees) and repeats the Acknowledgement/Response signal routine.

In a specific embodiment, connector 100 is a highly serialized port that provides all video, audio, USB and other data signals over two pairs of serial contacts. Thus, connector 100 includes just four contacts: A first pair of differential transmit data contacts 104*a* and 104*b* on one side of the connector, and a second pair of differential receive data contacts 104*c*, 104*d* (not shown in FIG. 1) on the opposite side. As discussed above, connector 100 is orientation agnostic and can be inserted into a corresponding receptacle connector in any one of two orientations. FIG. 2 is a diagram depicting pin locations of connector plug 100 according to one embodiment of the invention. None of the four contacts are dedicated for power. Instead, power can be supplied over the data contacts using a standard such as power over Ethernet.

Figure 1B:
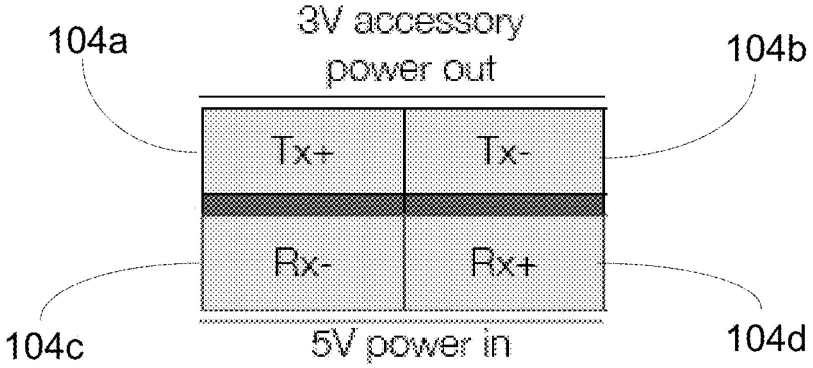
FIG. 1B is a pin-out schematic for the connector plug according to an embodiment of the present invention.

FIG. 1B illustrates contact configuration of connector 100 according to an embodiment of the present invention. As illustrated in FIG. 1B, contacts 104*a* and 104*b* may carry the differential data signals for the data that is being transmitted from plug connector 100 to a host device. Contacts 104*c* and 104*d* may carry the differential data signals for the date is being received from the host device. A receptacle connector associated with the host device may have complementary contacts that receive signals from and transmit signals to the accessory via plug connector 200.

Figure 2A:
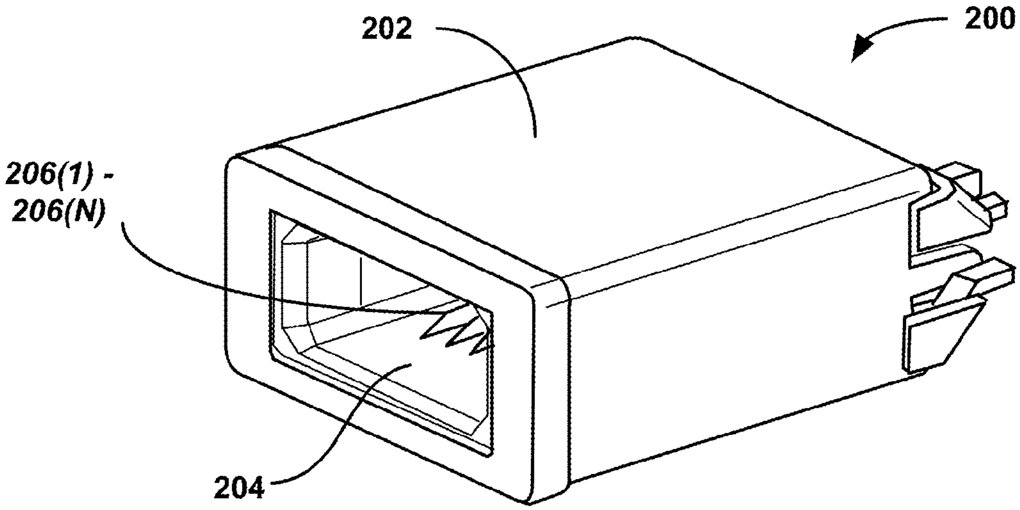
FIG. 2A is a simplified perspective view of a receptacle connector according to an embodiment of the present invention.

FIG. 2A illustrates a receptacle connector 200 according to an embodiment of the present invention. Receptacle connector 200 includes a housing 202 that defines a cavity 204 and houses N contacts $\mathbf{206}_{(1)}$-$\mathbf{206}_{(N)}$ within the cavity. In operation, a connector plug, such as plug connector 100 can be inserted into cavity 204 to electrically couple the contacts 104*a*, 104*b* or 104*c*, 104*d* to respective contacts $\mathbf{206}_{(1)}$-$\mathbf{206}_{(N)}$. Each of the receptacle contacts $\mathbf{206}_{(1)}$-$\mathbf{206}_{(N)}$ electrically connects its respective plug contact to circuitry associated with the electrical device in which receptacle connector 200 is housed. For example, receptacle connector 200 can be part of a portable media device and electronic circuitry associated with the media device is electrically connected to receptacle 200 by soldering tips of contacts $\mathbf{206}_{(1)}$-$\mathbf{206}_{(N)}$ that extend outside housing 202 to a multilayer board such as a printed circuit board (PCB) within the portable media device. In some embodiments, connector 200 may have contacts on each side corresponding to the contacts on plug connector 100.

Figure 2B:
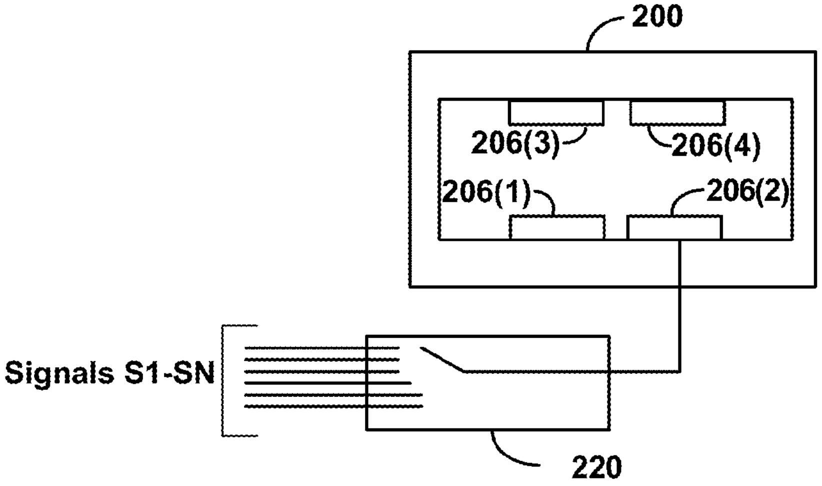
FIG. 2B is a simplified cross-sectional schematic view of the receptacle connector according to an embodiment of the present invention.

In some embodiments, receptacle connector 200 may have four contacts $\mathbf{206}_{(1)\text{-}(N)}$ with two contacts $\mathbf{206}_{(3)}$-$\mathbf{206}_{(4)}$ arranged along a top side inside cavity 204 and two contacts $\mathbf{206}_{(1)}$-$\mathbf{206}_{(2)}$ arranged along a bottom side inside cavity 204 as illustrated in FIG. 2B. Each of these contacts may be configured to perform one of several functions depending on the signals available on a plug connector. Plug connector 100 may be associated with any one of several accessories that may be designed to work with a host device that is associated with receptacle connector 200. For example, plug connector 100 may be associated with an audio only accessory in which case the signals available on the contacts of the plug connector may include audio and related signals. In other instances, where plug connector 100 is associated with a more complex accessory such as video accessory, the contacts of plug connector may carry audio, video, and related signals. Thus, in order to enable receptacle connector 200 to be operable with various different types of signal, contacts $\mathbf{206}_{(1)\text{-}(4)}$ of receptacle connector 200 can be made dynamically configurable based on the signals available from a plug connector 100.

In the particular embodiment illustrated in FIG. 2B, receptacle connector 200 has four contacts $\mathbf{206}_{(1)\text{-}(4)}$. Each contact $\mathbf{206}_{(1)\text{-}(4)}$ has an associated multiplexing circuitry 220 that can configure the contact to carry on of many possible signals. In some embodiments, multiplexing circuitry may be a switch that can connect the associated contact to one of several signal paths. However, for ease of explanation only one multiplexing circuit 220 associated with contact $\mathbf{206}_{(2)}$ is illustrated in FIG. 2B. It is to be noted that each of the contacts $\mathbf{206}_{(1)}$-$\mathbf{206}_{(4)}$ may have a multiplexing circuit coupled to it. In other embodiments, both the contacts may be coupled to a single multiplexing circuit that configures the contacts. As illustrated in FIG. 2B, switch 220 can be used to configure contact $\mathbf{206}_{(2)}$ to carry any one of signals $S_1$-$S_n$ depending on the configuration of the plug connector.

For example, consider that plug connector 100 has contact configuration as illustrated in FIG. 1B. When plug connector 100 is inserted into receptacle connector 200, the four contacts of plug connector 100 are in physical contact with the four contacts of receptacle connector 200. In order to receive/transmit data via plug connector 100, the receptacle connector contacts have to be configured accordingly. In other words, the receptacle connector contacts that are in physical contact with contacts 104*a* and 104*b* of plug connector 100 have to be configured to receive data and the receptacle connector contacts that are in physical contact with contacts 104*c* and 104*d* of plug connector 100 have to be configured to transmit data. The switching circuit 220 can be used to couple the contacts in receptacle connector to appropriate circuitry in the host device. For instance, if contacts 104*a* and 104*b* are carrying an audio signal to the host device, the corresponding contacts in receptacle connector can be coupled to the circuitry that can receive and process the audio signal.

FIG. 3 is a table illustrating some sample configurations for the input/output signals that may be available on contacts 104*a*-104*d* of plug connector 100 according to an embodiment of the present invention. As illustrated in FIG. 3, if plug connector 100 is associated with a charge/sync cable, then contact 104*a* may carry the voltage (e.g., VBus), contact 104*b* may be unused (or floating), contacts 104*c* and 104*d* may be used for differential data signals.

In the instance where connector 100 is associated with a powered accessory, contact 104*a* may carry the voltage (e.g., VBus), contact 104*b* may carry the accessory ID signal, and contacts 104*c* and 104*d* may be used for differential data signals.

In the instance where connector 100 is associated with a wired headset accessory, or a headphone adapter, contact 104*a* may carry the microphone out signal, contact 104*b* may be used as analog ground, and contacts 104*c* and 104*d* may be used for left and right audio signals, respectively.

In the instance where connector 100 is associated with an unpowered accessory, contact 104*a* may carry the voltage out signal, contact 104*b* may be carry the accessory ID signal, and contacts 104*c* and 104*d* may be used for differential data signals, respectively.

In an embodiment, plug connector 100 may be associated with an audio/video adapter accessory. In this instance plug connector 100 may have four contacts with two contacts dedicated for receiving data and two contacts dedicated to transmitting data. Such a video adapter may support a variety of data types such as HDMI, VGA, component video, digital and/or analog audio, and other audio/video related signals. In this instance some or all of these various signals may need to be communicated between the host device and the accessory. In order to accomplish this using the available four contacts. The data is serialized and de-serialized on the host and/or the accessory side and transmitted at a very high rate, e.g., 10-15 Gbits/sec over the two transmit contacts and received at the same high rate via the two receive contacts. This enables even the bandwidth intensive data, e.g., hi-definition video data, to be transmitted and received using just two contacts. In an embodiment, the video data received/transmitted by the accessory may include display port related data. In some embodiments, the accessory can transmit/receive, audio, video and other data over the two receive and the two transmit contacts. In some embodiments, the other data may include control data, accessory identification data, host identification data, or any other non-audio or non-video data.

Based on the contact configuration of plug connector, the contacts of the receptacle connector can be configured to match that configuration. Thus, by using only four contacts in a connector, several different types of signals can be processed. This enables a wider range of accessories to be used with the host device while keeping the connectors small and making them more versatile.

Figure 4:
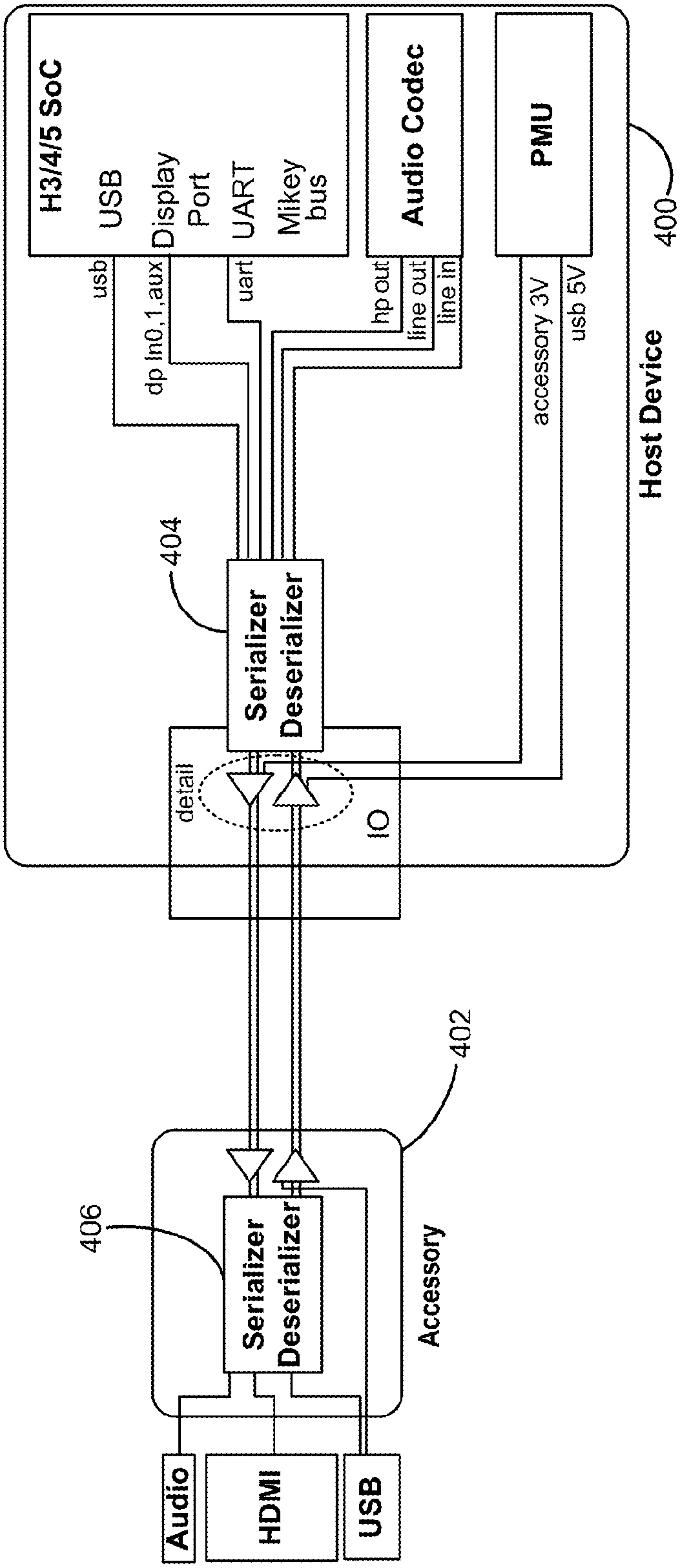
FIG. 4 is a block diagram illustrating a host device communicably coupled to an accessory according to an embodiment of the present invention.
Figure 5:
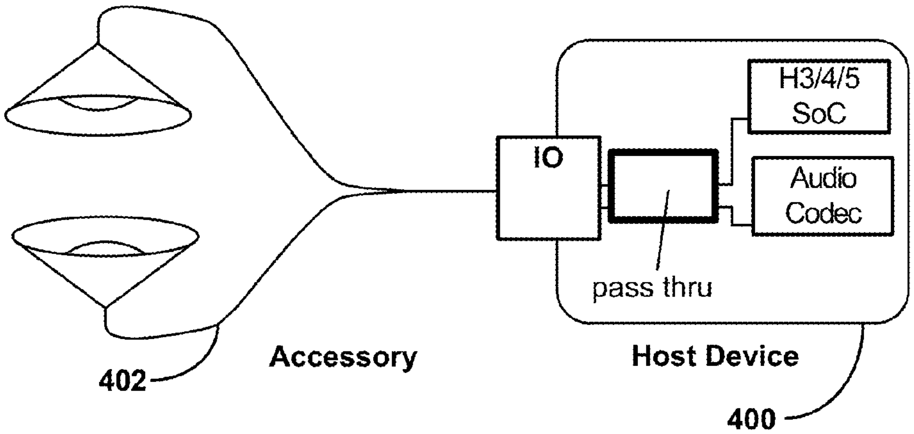
FIG. 5 is a block diagram illustrating a host device communicably coupled to an accessory device according to another embodiment of the present invention.
Figure 6:
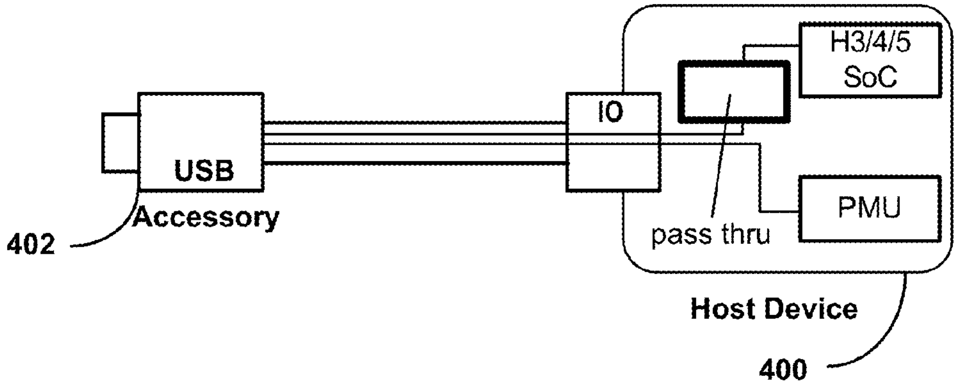
FIG. 6 is a block diagram illustrating a host device communicably coupled to an accessory device according to yet another embodiment of the present invention.

Data to and from connector 100 is multiplexed by serializer/de-serializer circuitry on both the plug connector and receptacle connector sides as shown in FIG. 4. When connector 100 is used to support relatively simple functions, such as headphone mode or charger/sync mode, the serializer/deserializer circuitry may not be necessary and instead appropriate pass thru circuitry can be employed as shown in FIGS. 5 and 6.

A serializer is a circuit that takes as its input n bits of parallel data changing at rate y and transforms them into a serial stream at a rate of n times y. A de-serializer is a circuit that takes as its input a serial stream at a rate of n times y and changes it into parallel data of width n changing at rate y. Using the SERDES enables transmission of data in the range of 10-15 Gbits/sec between a host device and an accessory. Thus a single port using just two pairs of contacts can be used to transmit and receive all the I/O signals between a host device and an accessory at a very high rate.

As illustrated in FIG. 4, a host device 400 is communicably coupled to an accessory 402, e.g., using a plug connector 100 and a receptacle connector 200 described above, according to an embodiment of the present invention. As illustrated, in this embodiment, accessory 402 supports audio, HDMI, and USB signals. As is known in the art, these signals for audio, HDMI, and USB differ considerably. However, all these different types of signals are communicated between accessory 402 and host device 400 using just the four contacts on connectors 100 and 200.

A serializer/de-serializer (SERDES) 404, 406 on the host side and the accessory side, respectively, makes the communication of these differing signals possible. In one instance, when accessory 402 wants to send HDMI and audio related signals to host 400, SERDES 406 takes these signals and converts them into a serial stream and communicates that to host device 400. At the other end, SERDES 404 receives this serial communication, analyzes the stream to determine the type of signals being received. Once the type of signals are known, SERDES 404 routes the signals to the appropriate circuitry within host device 400. Thus, in our example, the HDMI signals may be routed to a display port circuitry in host device 400 for further processing and outputting on a display device and the audio signals may be routed to audio processing circuitry for output on an audio device. Thus, any number and/or type of signals can be communicated between accessory 402 and host device 400 using just two pairs of contacts. This makes the accessory very easy to manufacture with less complexity and less cost. Also having a connector with only two contacts reduces the chances of cross-talk between adjacent signals resulting in less points of possible failures.

However, since plug connector 100 is orientation agnostic, it may be beneficial to first determine the orientation of plug connector 100 with respect to receptacle connector 200. Once the orientation is determined and the signals on the contacts of plug connector 100 are known, the contacts in receptacle connector 200 can be configured accordingly. For instance, continuing our above example, it would be beneficial for the host device to know (a) which signals can be sent by the accessory on each of the four contacts of the plug connector and (b) which contact of the plug connector is coupled to which contact of the receptacle connector of the host device. Once this information is known, the host device can couple the contacts in the receptacle connector with the appropriate circuitry within the host device.

For example, consider that contact 104*a* of plug connector 100 carries an audio signal, contact 104*b* of plug connector 100 carries a power (voltage signal), and contact 104*c* of plug connector 100 carries the HDMI signal. Further consider that contact 104*a* is physically coupled to contact $\mathbf{206}_{(1)}$ of receptacle connector 200, contact 104*b* is physically coupled to contact $206_{(2)}$, and contact 104*c* is physically coupled to contact $206_{(3)}$. Before communication between the accessory and the host device can occur, it may be necessary that this information be known to the host device so that the host device can properly couple the contacts in the receptacle connector to the appropriate circuitry. In other words, the host device may determine the orientation of the plug connector with respect to the receptacle connector. One technique that can be used to determine the orientation information is described below.

FIG. 7 is a flow diagram of a process 700 for determining orientation of the plug connector with respect to the receptacle connector according to an embodiment of the present invention. Process 700 can be performed by, e.g., host device 400 of FIG. 4.

Initially, the host device can detect whether an accessory is coupled to the host device (702). In one embodiment, the host device can detect that the retention mechanism of the host device receptacle connector has engaged with pockets 106*a* and 106*b* of a plug connector of the accessory. Thereafter, the host device can monitor two contacts (a first contact and a second contact) of the receptacle connector to determine whether there is power, e.g., 5V, on any one of those two contacts (704). For example, the host device may monitor receptacle contacts corresponding to contacts 104*a* and 104*d* of the plug connector to determine whether there is power on any of those contacts. If yes, process 700 proceeds as illustrated in FIG. 7C.

Figure 7A:
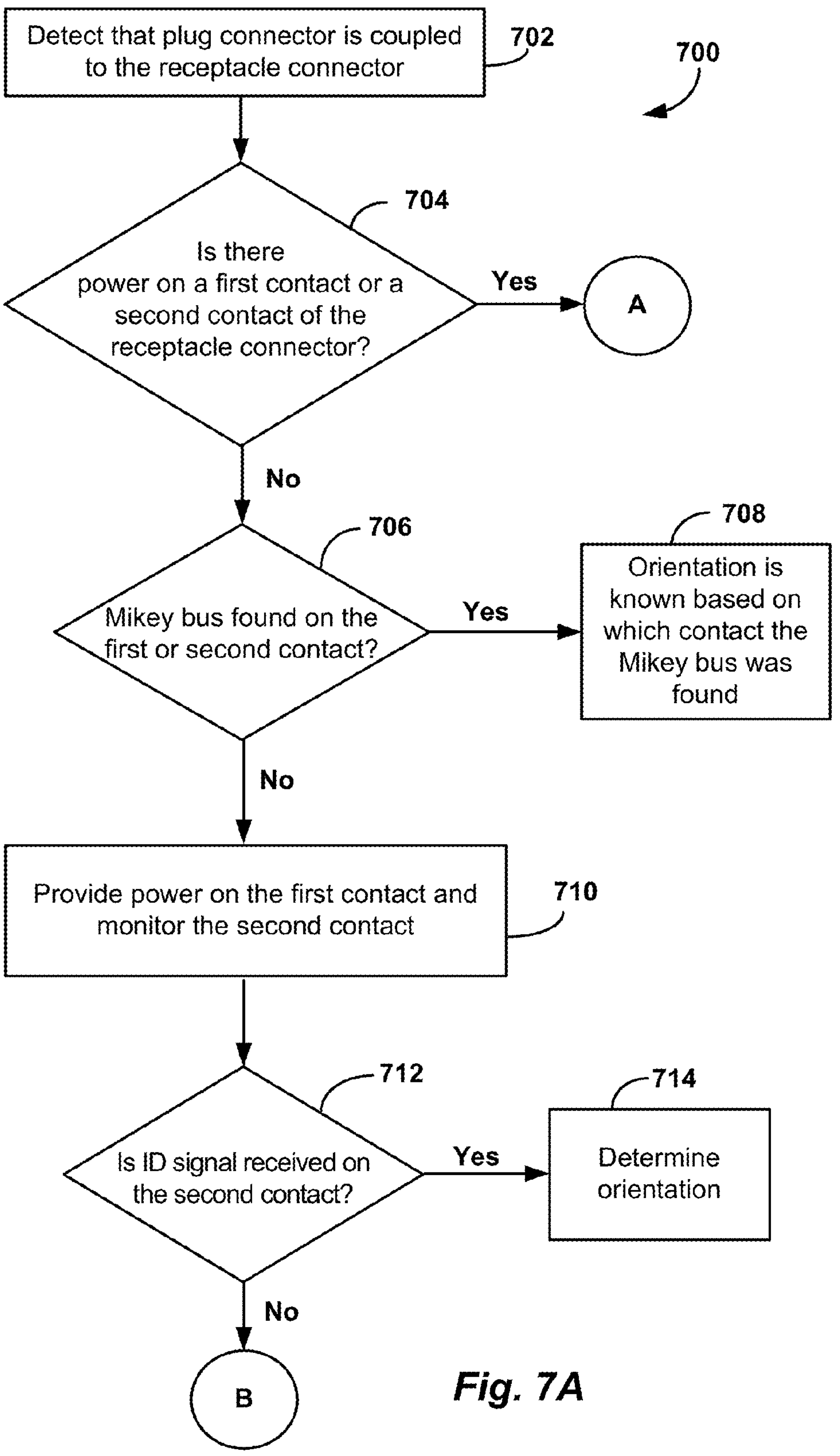
FIGS. 7A-7C is a flow diagram of a process for conducting communication between a host device and an accessory device according to an embodiment of the present invention.
Figure 7B:
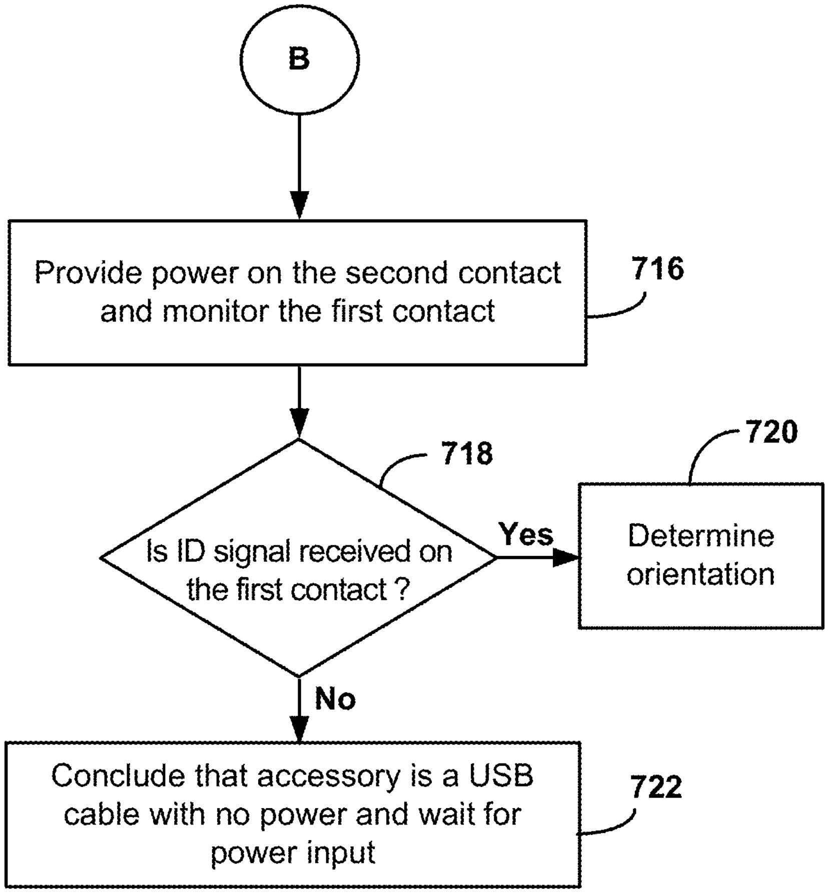
Figure 7C:
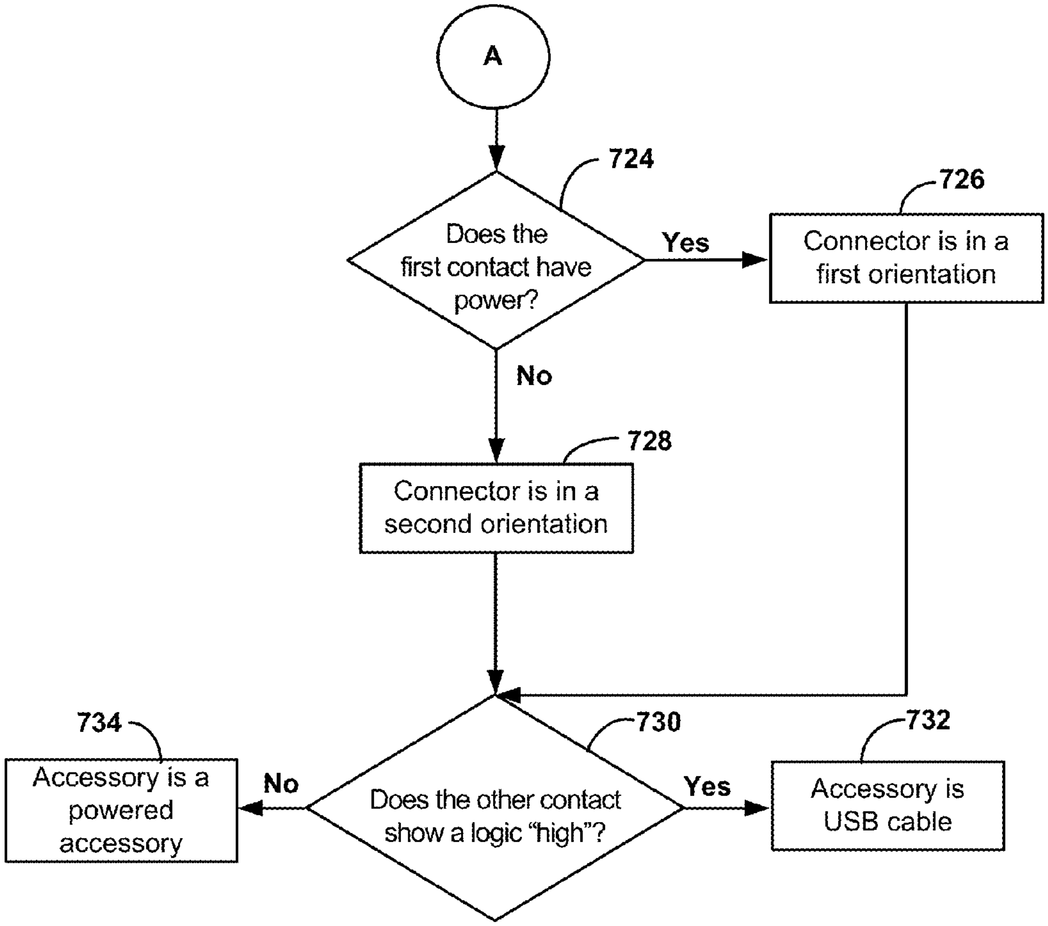

As shown in FIG. 7C, if power is detected on either of the two contacts, the host device may determine whether there is power on the first contact (724). If it is determined that there is power on the first contact, the host device can determine that the plug connector is connected in a first orientation with respect to the receptacle connector (726). If power is not found on the first contact then the second contact has the power and the host device may determine that the plug connector is connected in a second orientation with respect to the receptacle connector (728). Once the orientation is determined, the host device can check whether the contact that does not have the power is in a logic "high" state (730). If the contact that does not have the power is in a logic "high" state, the host device can conclude that the accessory associated with the plug connector is a USB cable (732). If the contact that does not have the power is in a logic "low" state, the host device can conclude that the accessory associated with the plug connector is a powered accessory (734).

Returning back to FIG. 7A, if at block 704 it is determined that none of the first contact or the second contact has power on them, the host device can check to see if a Mickey bus (e.g., audio signal) signal is present on any of the two contacts (706). If a Mickey bus signal is detected on any one of the two contacts, the host device can determine the orientation of the plug connector based on predefined signal locations for a Mickey bus accessory (708). If the host device does not detect a Mickey bus signal on either of the two contacts, the host device may provide power (e.g., 5V) on the first contact and monitor the second contact (710). If a valid ID signal is detected on the second contact in response to providing power on the first contact (712), the host device can determine the orientation of the plug connector since now it knows the location of contact that carries the ID signal (714).

If no ID signal is detected on the second contact, process 700 continues as illustrated in FIG. 7B. The host device then provides power on the second contact and monitors the first contact (716). If a valid ID signal is detected on the first contact (718), the host device can determine orientation of the plug connector as described above (720). However, if no ID signal is detected on the first contact, the host device can conclude that the plug connector is associated with a USB cable and may wait for power to be supplied over one of the contacts of the plug connector (722).

It should be appreciated that the specific steps illustrated in FIGS. 7A-C provide a particular method of determining orientation according to an embodiment of the present invention. Other sequences of steps may also be performed according to alternative embodiments. For example, alternative embodiments of the present invention may perform the steps outlined above in a different order. Moreover, the individual steps illustrated in FIGS. 7A-C may include multiple sub-steps that may be performed in various sequences as appropriate to the individual step. Furthermore, additional steps may be added or removed depending on the particular applications. One of ordinary skill in the art would recognize many variations, modifications, and alternatives.

As will be understood by those skilled in the art, the present invention may be embodied in other specific forms without departing from the essential characteristics thereof. For example, while embodiments of the invention discussed above with respect to data plugs having twelve contacts, the invention is not limited to any particular number of contacts or any particular type of connector. As another example, while many of the plug connectors discussed above included ground rings that completely surrounded (in the horizontal plane) the contacts formed on the upper and lower surfaces of the connectors, in other embodiments ground structures can be employed that only partially surround the contacts.

Additionally, some embodiments of the invention may have as few as two contacts while other embodiments can have thirty or even more contacts. Similarly, embodiments of the invention are not limited to data connectors. Also, any of the connectors discussed herein can be modified to include one or more fiber optic cables that extend through the connector and can be operatively coupled to receive or transmit optical data signals between a mating connector jack. Those skilled in the art will recognize, or be able to ascertain using no more than routine experimentation, many equivalents to the specific embodiments of the inventions described herein. Such equivalents are intended to be encompassed by the following claims.

What is claimed is:

1. A method comprising:

detecting, by a host device, connection of an accessory to the host device, wherein the connection comprises a plug connector associated with the accessory being inserted into a receptacle connector associated with the host device;

determining, by the host device, whether the plug connector is in a first orientation or a second orientation with respect to the receptacle connector;

receiving, by the host device, a serialized data stream from the accessory, the serialized data stream including data associated with a plurality of data types;

parsing, by the host device, the serialized data stream to separate data for each of the plurality of data types; and communicating, by the host device, the data of each type to corresponding circuitry within the host device.

2. The method of claim 1 wherein the plurality of data types include HDMI data, audio data, USB data, or video data.

3. The method of claim 1 wherein the plug connector comprises:

a substantially flat connector tab having first and second major opposing sides;

a plurality of electrical contacts formed on the connector tab, the plurality of contacts including a first set of contacts formed on the first major side and a second set of contacts formed on the second major side, wherein the first plurality of contacts are symmetrically spaced with the second plurality of contacts so that the connector tab has 180 degree symmetry and can be inserted and operatively coupled to a corresponding receptacle connector in either of two positions.

4. The method of claim 3 wherein the plurality of electrical contacts include four contacts.

5. The method of claim 1 wherein, in response to determining whether the plug connector is in a first orientation or a second orientation, the host switches circuitry within the host coupled to contacts in the receptacle connector based on the determined orientation.

6. The method of claim 1 wherein the plug connector has a first pair of differential data contacts configured to transmit data on one side of the connector and a second pair of differential data contacts configured to receive data on an opposing side of the connector.

7. An accessory comprising:

a plug connector having a first pair of differential data contacts configured to transmit data and a second pair of differential data contacts configured to receive data; and serializer/de-serializer circuitry coupled to the plug connector and configured to:

generate first serialized data comprising audio, video, and other data and communicate the serialized data to a connected host device; and receive second serialized data from the host device and separate out individual data components from the second serialized data;

wherein the each of the individual data components is communicated to an corresponding circuitry for further processing.

8. The accessory of claim 7 wherein the first pair of contacts are disposed on a first surface of the plug connector and the second pair of contacts are disposed on a second surface of the plug connector opposing the second surface.

9. The accessory of claim 7 wherein the video comprises display port related data.

10. The accessory of claim 7 wherein the other data includes one or more of: control data, accessory identification data, host device identification data, or any other non-audio/non-video data.

11. The accessory of claim 7 wherein the plug connector is a reversible connector that includes opposing first and second sides, and wherein the first pair of differential data contacts is on the first side of the plug connector and the second pair of differential data contacts is on the second side of the plug connector directly opposite the first pair of differential data contacts.

12. The accessory of claim 7 wherein the plug connector does not include a contact dedicated for power and receives power over one or more of the differential data contacts.

13. The accessory of claim 7 wherein:

the accessory further comprises first circuitry configured to communicate via a first protocol and second circuitry configured to communicate via a second protocol different than the first protocol;

the serializer/de-serializer circuitry is coupled between each of the first and second circuitry and the first and second pairs of differential data; and the serializer/de-serializer circuitry is further configured to: (i) combine data from the first circuitry and second circuitry into a first serial data stream and communicate the serial data stream to the host over the first pair of differential data contacts, and (ii) receive a second serial data stream from the second pair of differential data contacts that includes data formatted according to both the first communication protocol and the second communication protocol, and separate data from the second data stream by sending data formatted according to the first communication protocol to the first circuitry and sending data formatted according to the second communication protocol to the second circuitry.

14. The accessory of claim 13 wherein the first communication protocol is a USB protocol.

15. The accessory of claim 14 wherein the second communication protocol is an HDMI protocol.

16. An electronic device comprising:

a receptacle connector including:

a housing that defines a cavity formed between top and bottom surfaces along with first and second side surfaces that extend between the top and bottom surfaces, the top and bottom surfaces being arranged opposite one another;

a first pair of electrical contacts positioned along the top surface of the housing; and a second pair of electrical contacts positioned along the bottom surface of the housing and arranged opposite the first pair of electrical contacts, a first communication circuitry configured to input and output data using a first communication protocol;

a second communication circuitry configured to input and output data using a second communication protocol different than the first communication protocol;

serializer circuitry coupled to the receptacle connector, the first communication circuitry, and the second communication circuitry, the serializer circuitry being configured to transform data simultaneously output from the first communication circuitry and the second communication circuitry into a serial data stream, the data being output from the first communication circuitry using the first communication protocol, the data being output from the second communication circuitry using the second communication protocol, and the serializer circuitry being further configured to communicate the serial data stream to an accessory over the first pair of electrical contacts; and de-serializer circuitry coupled to the receptacle connector, the first communication circuitry, and the second communication circuitry, the de-serializer circuitry being configured to receive a serial data stream from the accessory over the second pair of electrical contacts, the received serial data stream comprising data formatted according to a plurality of communication protocols including the first communication protocol and the second communication protocol, the de-serializer circuitry being further configured to transform the serial data stream received from the accessory over the second pair of electrical contacts into a parallel data stream based on the communication protocols used to form the serial data stream received from the accessory, the parallel data stream being formed such that a first stream of data in the parallel data stream is associated with the first communication protocol and a second stream of data in the parallel data stream is associated with the second communication protocol, the de-serializer circuitry being further configured to communicate the first stream of data to the first communication circuitry and the second stream of data to the second communication circuitry.

17. The electronic device of claim 16, wherein the first pair of electrical contacts are symmetrically spaced with the second pair of electrical contacts so that a corresponding plug connector having 180 degree symmetry can be inserted and operatively coupled to the receptacle connector in either a first orientation or a second orientation, and the electronic device further comprises:

sensing circuitry configured to determine whether the corresponding plug connector is inserted in the first orientation or the second orientation;

wherein the serializer circuitry is further configured to communicate the serial data stream to the accessory over the first pair of electrical contacts when it is determined that the corresponding plug connector is inserted in the first orientation, and is configured to communicate the serial data stream to the accessory over the second pair of electrical contacts when it is determined that the corresponding plug connector is inserted in the second orientation; and wherein the de-serializer circuitry is further configured to transform a serial data stream received from the accessory over the second pair of electrical contacts into a parallel data stream when it is determined that the corresponding plug connector is inserted in the first orientation, and is configured to transform a serial data stream received from the accessory over the first pair of electrical contacts into a parallel data stream when it is determined that the corresponding plug connector is inserted in the second orientation.

18. The electronic device of claim 17, wherein the first pair of electrical contacts includes a first receptacle contact and a second receptacle contact, the second pair of electrical contacts includes a third receptacle contact and a fourth receptacle contact, the first receptacle contact is arranged opposite the third receptacle contact, the second receptacle contact is arranged opposite the fourth receptacle contact, and the sensing circuitry is further configured to:

detect connection of the receptacle connector and the corresponding plug connector, wherein the connection comprises the first pair of electrical contacts of the receptacle connector being electrically coupled to a corresponding first pair of electrical contacts of the plug connector and the second pair of electrical contacts of the receptacle connector being electrically coupled to a corresponding second pair of electrical contacts of the plug connector;

monitor the first receptacle contact and the fourth receptacle contact to determine whether power is being received at either of those electrical contacts;

when power is received at either the first receptacle contact or the fourth receptacle contact:

determine that the corresponding plug connector is inserted in the first orientation when power is received at the first receptacle contact; and determine that the corresponding plug connector is inserted in the second orientation when power is received at the fourth receptacle contact; and when power is not received at either the first receptacle contact or the fourth receptacle contact:

apply power to the first receptacle contact;

monitor the fourth receptacle contact to determine whether an identification signal is received from the accessory over the fourth receptacle contact;

when an identification signal is received over the fourth contact, determine that the corresponding plug connector is inserted in the first orientation; and when no identification signal is received over the second contact:

apply power to the fourth receptacle contact;

monitor the first receptacle contact to determine whether an identification signal is received from the accessory over the first receptacle contact; and when an identification signal is received over the first receptacle contact, determine that the corresponding plug connector is inserted in the second orientation.

19. The electronic device of claim 16, wherein the first pair of electrical contacts and the second pair of electrical contacts are the only electrical contacts in the receptacle connector.

20. A method of operating an electronic device having a receptacle connector, a first communication circuitry, a second communication circuitry, serializer circuitry, and de-serializer circuitry, comprising:

in communicating data from the electronic device to an accessory coupled to the electronic device via the receptacle connector:

simultaneously outputting data from the first communication circuitry and the second communication circuitry into a serial data stream, the first communication circuitry being configured to input and output data using a first communication protocol, the second communication circuitry configured to input and output data using a second communication protocol different than the first communication protocol, the data being output from the first communication circuitry using the first communication protocol, the data being output from the second communication circuitry using the second communication protocol; and communicating the serial data stream to the accessory over a first pair of electrical contacts positioned along a top surface of a housing of the receptacle connector, the housing defining a cavity formed between the top surface, a bottom surface, and side surfaces that extend between the top and bottom surfaces, the top and bottom surfaces being arranged opposite one another; and in receiving data at the electronic device from the accessory:

receiving a serial data stream from the accessory over a second pair of electrical contacts positioned along the bottom surface of the housing and arranged opposite the first pair of electrical contacts, the received serial data stream comprising data formatted according to a plurality of communication protocols including the first communication protocol and the second communication protocol;

transforming the received serial data stream into a parallel data stream based on the communication protocols used to form the received serial data stream, the parallel data stream being formed such that a first stream of data in the parallel data stream is associated with the first communication protocol and a second stream of data in the parallel data stream is associated with the second communication protocol; and communicating the first stream of data to the first communication circuitry and the second stream of data to the second communication circuitry.

21. The method of claim 20, wherein the first pair of electrical contacts are symmetrically spaced with the second pair of electrical contacts so that a corresponding plug connector having 180 degree symmetry can be inserted and operatively coupled to the receptacle connector in either a first orientation or a second orientation, and the method further comprises:

determining whether the corresponding plug connector is inserted in the first orientation or the second orientation;

in communicating data from the electronic device to an accessory coupled to the electronic device via the receptacle connector:

communicating the serial data stream to the accessory over the first pair of electrical contacts when it is determined that the corresponding plug connector is inserted in the first orientation; and communicating the serial data stream to the accessory over the second pair of electrical contacts when it is determined that the corresponding plug connector is inserted in the second orientation; and in receiving data at the electronic device from the accessory:

transforming a serial data stream received from the accessory over the second pair of electrical contacts into a parallel data stream when it is determined that the corresponding plug connector is inserted in the first orientation; and transforming a serial data stream received from the accessory over the first pair of electrical contacts into a parallel data stream when it is determined that the corresponding plug connector is inserted in the second orientation.

22. The method of claim 21, wherein the first pair of electrical contacts includes a first receptacle contact and a second receptacle contact, the second pair of electrical contacts includes a third receptacle contact and a fourth receptacle contact, the first receptacle contact is arranged opposite the third receptacle contact, the second receptacle contact is arranged opposite the fourth receptacle contact, and the method further comprises:

detecting connection of the receptacle connector and the corresponding plug connector, wherein the connection comprises the first pair of electrical contacts of the receptacle connector being electrically coupled to a corresponding first pair of electrical contacts of the plug connector and the second pair of electrical contacts of the receptacle connector being electrically coupled to a corresponding second pair of electrical contacts of the plug connector;

monitoring the first receptacle contact and the fourth receptacle contact to determine whether power is being received at either of those electrical contacts;

when power is received at either the first receptacle contact or the fourth receptacle contact:

determining that the corresponding plug connector is inserted in the first orientation when power is received at the first receptacle contact; and determining that the corresponding plug connector is inserted in the second orientation when power is received at the fourth receptacle contact; and when power is not received at either the first receptacle contact or the fourth receptacle contact:

applying power to the first receptacle contact;

monitoring the fourth receptacle contact to determine whether an identification signal is received from the accessory over the fourth receptacle contact;

when an identification signal is received over the fourth contact, determining that the corresponding plug connector is inserted in the first orientation; and when no identification signal is received over the second contact:

applying power to the fourth receptacle contact;

monitoring the first receptacle contact to determine whether an identification signal is received from the accessory over the first receptacle contact; and when an identification signal is received over the first receptacle contact, determining that the corresponding plug connector is inserted in the second orientation.

23. The method of claim 20, wherein the first pair of electrical contacts and the second pair of electrical contacts are the only electrical contacts in the receptacle connector.

* * * * *